J. Agate,

Beer Cooler.

No. 90,716. Patented June 1, 1869.

Witnesses
Wm. S. Loughborough.
J. H. Clemast

Inventor.
John Agate.

United States Patent Office.

JOHN AGATE, OF PITTSFORD, NEW YORK.

Letters Patent No. 90,716, dated June 1, 1869.

IMPROVED BEER-COOLER.

The Schedule referred to in these Letters Patent and making part of the same.

*To all whom it may concern:*

Be it known that I, JOHN AGATE, of Pittsford, in the county of Monroe, and State of New York, have invented certain new and useful Improvements in Beer-Coolers; and I do hereby declare that the following is a full, clear, and exact description thereof, reference being had to the accompanying drawings, making part of this specification, in which—

Like letters of reference indicate corresponding parts in the several figures. The red arrows indicate the direction of the beer currents, and the black ones that of the cold water.

The nature of this invention will be better understood by reference to the drawings and specification.

To enable others to make and use my invention, I will describe its construction and operation.

I use an ordinary wooden vat, A, of any desired size.

Figure 1:
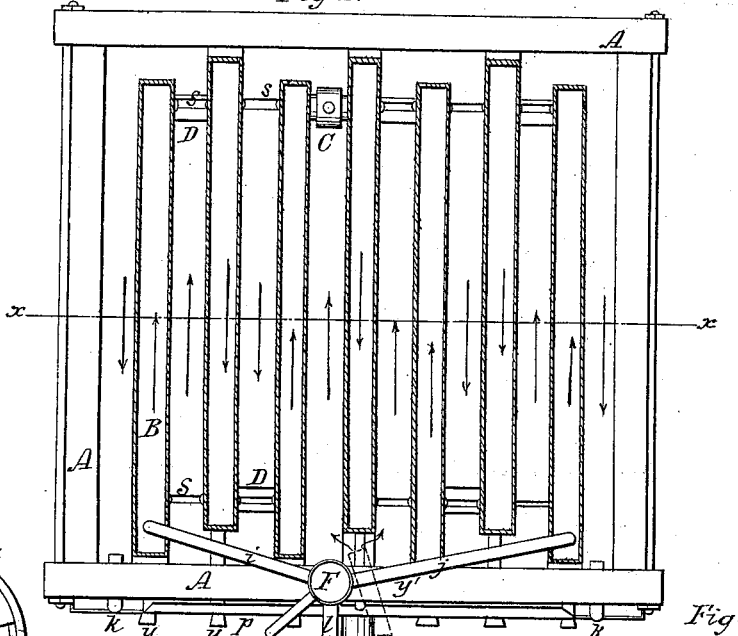
Figure 1 is a top view of my invention.

The beer-channels B are each firmly packed at the bottom, and the opposite end of each alternate one, to the end of the vat, as shown in fig. 1.

The channels B are made similar to those shown in my patent of July 14, 1868. They may be rigidly connected together in sections of two or more, and the sections connected by the coupling C.

The channel-connections are made at or near the bottom, by the pipes D.

There may be stays S rigidly attached between the chambers.

The central channel has a large discharge-pipe, P, at the bottom, in front.

Figure 2:
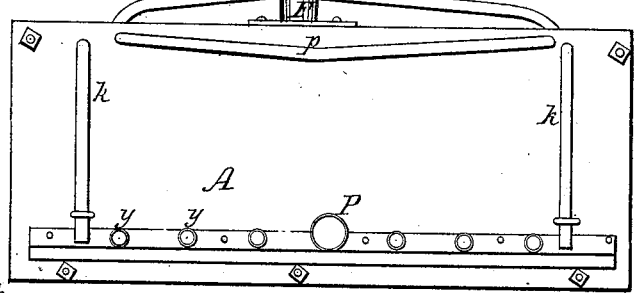
Figure 2 is an elevation of the front end of the same.
Figure 3:
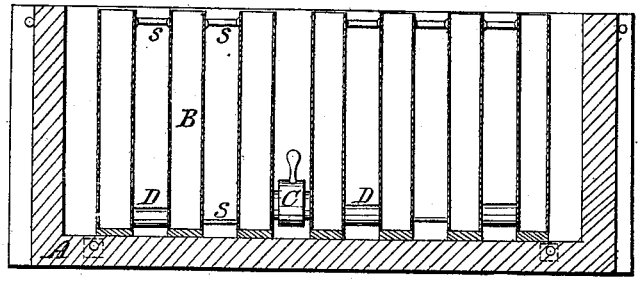
Figure 3 is a transverse section, taken in the plane of the red line $x$ in fig. 1.

I provide a pipe, $p$, figs. 1 and 2, so arranged as to convey any surplus of beer that might be discharged into the outside channels, into the central channel, through pipe $n$.

Each channel is provided with a discharge-pipe, $y$, at the front end. They facilitate the cleaning out of the flues or channels, and they may be closed when in use, by means of corks or faucets.

Figure 6:
Figure 6 is a horizontal section of the faucet F.
Figure 5:
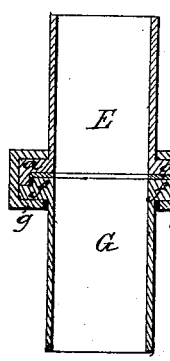
Figure 5 is a section of the coupling, taken in the plane of the red line $o$, fig. 4.

The faucet F is made as seen fig. 6, so as to register its three openings to the induction-pipe and the two discharge-pipes at the same time, whereby the flow may be equalized in both pipes.

Figure 4:
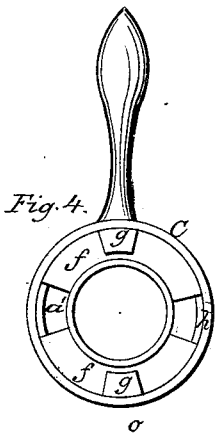
Figure 4 is an end view of the coupling C.

The coupling C is made with a flat collar, $a$, on section E, and two inclined planes, $f$, fig. 4, on section G, with an open space, $a'$, between, on each side, to receive the lugs, $g$, cast upon one side of the coupling-ring $h$, the other side having a plain collar. The operation of the coupling will appear obvious.

The beer passes into the cooler at the top of the two outside channels, and flows to the opposite end, through the pipes D, at the bottom, into the next channel, and so on to the discharge.

The cold water runs in through a pipe indicated by the dotted lines at $y'$, whence it parts, running each way, in the direction of the black arrows, and is discharged through the pipes $k$.

The object of having the double counter-currents is to keep the channels as nearly full as may be, but this plan is only desirable in the larger class of coolers, in which the two liquids would have so far to travel that the channel could not be kept near full toward the discharge. The advantages of the arrangement of the channels herein shown, is, mainly, that it is a much cheaper plan, less cumbersome, and far more efficient than that shown in my former patent.

What I claim as my invention, and desire to secure by Letters Patent, is—

1. The coupling C, constructed and operating substantially as and for the purposes set forth.

2. The application of the faucet F, so constructed and arranged, in connection with the pipes $i$, $j$, and $l$, so as to operate in the manner and for the purposes set forth.

3. The arrangement of the beer-channels B, within the vat A, substantially as shown, so as to form the circuitous water-spaces by the channels themselves, for the purpose set forth.

4. The overflow-pipe $p$, arranged and operating as and for the purposes shown and described.

5. The arrangement of the induction beer-pipes $i$ and $j$, and exit-pipe P, in combination with the inlet-water pipe $y'$, and discharge-pipes $k$, or their equivalents, for the purpose of producing a double counter-current of the two liquids.

JOHN AGATE.

Witnesses:
WM. S. LOUGHBOROUGH,
J. M. HOWE.